United States Patent
Forestieri et al.

(10) Patent No.: US 7,333,734 B2
(45) Date of Patent: Feb. 19, 2008

(54) LINE CODING SCHEME FOR DIGITAL COMMUNICATIONS, TRANSMISSION METHOD AND APPARATUS

(75) Inventors: Enrico Forestieri, Parma (IT); Giancarlo Prati, Parma (IT)

(73) Assignee: Marconi Communications S.p.A., Genoa, Cornigliano (IT)

( * ) Notice: Subject to any disclaimer, the term of this patent is extended or adjusted under 35 U.S.C. 154(b) by 581 days.

(21) Appl. No.: 10/450,326

(22) PCT Filed: Dec. 14, 2001

(86) PCT No.: PCT/IB01/02795

§ 371 (c)(1), (2), (4) Date: Nov. 7, 2003

(87) PCT Pub. No.: WO02/49299

PCT Pub. Date: Jun. 20, 2002

(65) Prior Publication Data
US 2004/0066856 A1   Apr. 8, 2004

(30) Foreign Application Priority Data
Dec. 15, 2000   (IT) ........................... MI2000A2727

(51) Int. Cl.
*H04B 10/04* (2006.01)
*H04L 27/00* (2006.01)
(52) U.S. Cl. .................. 398/182; 398/183; 375/295
(58) Field of Classification Search ........ 359/181–186, 359/191–192, 173; 375/295; 385/2–3, 8–9, 385/24, 56–57; 398/182–183; 341/56–57
See application file for complete search history.

(56) References Cited

U.S. PATENT DOCUMENTS 5,920,416 A * 7/1999 Beylat et al. ................ 398/185
6,424,444 B1 * 7/2002 Kahn et al. .................. 398/141

(Continued)

FOREIGN PATENT DOCUMENTS

EP   0 543 070 A1   5/1993

OTHER PUBLICATIONS

Proakis J. G. "Digital communications" 2nd edition 1989 pp. 186-190.*

(Continued)

*Primary Examiner*—Mohammed Ghayour
*Assistant Examiner*—Sophia Vlahos
(74) *Attorney, Agent, or Firm*—Kirschstein, et al.

(57) ABSTRACT

A coding scheme of order n for digital communications, in particular optical communication, for obtaining a coded signal x(t) which represents binary data which are constituted by sequences of information bits $\{u_k\}$ with rate T, the scheme having $N=2^n$ states, named $\Sigma_i$, for $i=1, 2, \ldots, N$, and comprising predetermined elementary signals $s_i(t)$ which are combined in the signal x(t). According to the scheme, if, at the time $t=kT$, the coding is in a state $\Sigma_m$ of the N states, the arrival of the information bit $u_k$ of the sequence $\{u_k\}$ forces a transition to the state $\Sigma_q$ of the N states and the selection of the elementary signal $s_i(t)$ as x(t), where q and i are given by the following equations: $d_i = m-1 \bmod 2$; $d_o = d_1 + u_k \bmod 2$; $y=2(m-1)+d_o$; $q=(r \bmod N)+1$; and $i=r+1$ if $r<N$, or $i=r-2N$ otherwise.

14 Claims, 5 Drawing Sheets

U.S. PATENT DOCUMENTS 6,592,274 B2 * 7/2003 Kahn et al. .................. 398/141

OTHER PUBLICATIONS

Eleftheriou, E., et al., *Quaternary Codes for Partial-Response Channels*, Proceedings of the Global Telecommunications Conference and Exhibition (Globecome), U.S. New York, IEEE, vol. , Dec. 2, 1990, pp. 1673-1678.

Penninckx, D., et al., *Experimental Verification of the Phase-Shaped Binary Transmission (PSBT) Effect*, IEEE Photonics Technology Letters, US, IEEE Inc., New York, vol. 10, No. 4, Apr. 1998, pp. 612-614.

Penninckx, D., et al., *The Phase-Shaped Binary Transmission (PSBT): A New Technique To Transmit Far Beyond the Chromatic Dispersion Limit*, IEEE Photonics Technology Letters, IEEE, Inc., New York, US., vol. 9, No. 2, Feb. 1, 1997, pp. 259-261.

John G. Proakis, *Digital Communications, Second Edition*, 1989, McGraw-Hill, Singapore, pp. 186-191.

Stark, J.B., et al., *Line Coding For Dispersion Tolerance and Special Efficiency: Doubinary and Beyond*, OFC/IOOC, 1999, *Optical Fiber Communication Conference/International Conference on Integrated Optics and Optical Fiber Communication*, San Diego, CA, Feb. 21-26, 1999, *Optical Fiber Communication Conference/International Conference on Integrated OP, Feonated*, Feb. 21, 1999, pp. WM46-1-.

Forestieri, E., *Evaluating the Error Probability In Lightwave Systems With Chromatic Dispersion, Arbitrary Pulse Shape and Pre- and Postdetection Filtering*, Journal of Lightwave Technology, IEEE, New York, US, vol. 18, No. 11, Nov. 2000, pp. 1493-1503.

*A New Robust Detector For Direct Conversion Receivers With DC Notching Filters*, IEEE, J. Stonick, et al., Department of Electrical and Computer Engineering, Oregon State Univ., Corvallis, Or, pp. 387-391, 2000.

*Novel Optical Line Codes Tolerant To Fiber Chromatic Dispersion*, Journal Of Lightwave Technology, vol. 19, No. 11, Nov. 2001, E. Forestieri, et al., pp. 1675-1684.

* cited by examiner

LINE CODING SCHEME FOR DIGITAL COMMUNICATIONS, TRANSMISSION METHOD AND APPARATUS

BACKGROUND OF THE INVENTION

The present invention relates to the field of encoding data for serial transmission in a transmission means, and is particularly applicable, but not limited, to the field of the optical communication systems.

Optical communications systems are a substantial and fast-growing constituent of communication networks. The expression "optical communication system", as used herein, relates to any system which uses optical signals to convey information. Such optical systems include, but are not limited to, telecommunications systems, cable television systems, and local area networks (LANs). Optical communication systems are configured to carry information in modulated beams of light carried over optical fibres. However, the optical fibres in use today have characteristics that limit the speed and distance of data transmission.

A dispersive fibre broadens an input pulse causing intersymbol interference at the receiver and limiting, for a prefixed data rate, the maximum connection distance. As this effect is due to the non-linear shape of the fibre phase response around the optical carrier frequency, a signal with a narrower bandwidth should suffer less from chromatic dispersion. A way to reduce the signal bandwidth is line coding, and one proposed candidate is the duobinary code.

Duobinary is a widely used code scheme in which a "0" ("zero") bit is represented by a zero-level electric current or voltage and a "1" ("one") bit is represented by a positive-level current or voltage if the quantity of "0" bits since the last "1" bit is even, and by a negative-level current or voltage if the quantity of "0" bits since the last "1" bit is odd. This logic can be reversed, exchanging the words "bits 0" and "bits 1" in the above discussion. Recently other line coding schemes, called Phrased Amplitude-Shift Siginalling (PASS) codes and based on a modification of the duobinary one, have been proposed by Stark et al. in "Line coding for dispersion tolerance and spectral efficiency: duobinary and beyond" Proc. OFC'99, 1999, vol. WM46-1, pp. 331-333.

An alternative coding scheme referred to as Phase-Shaped Binary Transmission (PSBT) has been described by Penninckx et al. in "The phase-shaped binary transmission (PSBT): a new technique to transmit far beyond the chromatic dispersion limit," IEEE Photon. Technol. Lett., vol. 9, no. 2, pp. 259-261, February 1997.

The performance of such coding techniques may be accurately evaluated and compared via an analytical method recently proposed by one of the present inventors in E. Forestieri, "Evaluating the error probability in lightwave systems with chromatic dispersion, arbitrary pulse shape and pre- and post-detection filtering", submitted to *J. Lightwave Technol.*, vol. 18, n. 11, November 2000.

SUMMARY OF THE INVENTION

There is a need for a new line code that provides better performance than existing ones. The general purpose of the present invention is to obviate the above mentioned shortcomings by making available a line coding scheme, a method and an apparatus which would permit better performances then the prior art.

In view of this purpose it was sought to provide in accordance with the present invention a coding scheme of order n for digital communications for obtaining a coded signal x(t) which represents binary data which are constituted by sequences of information bits $\{u_k\}$ with rate T, the scheme having $N=2^i$ states, named $\Sigma_i$, $i=1, 2, \ldots, N$, and comprising predetermined elementary signals $s_i(t)$ which are combined in the signal x(t), characterized in that if at the time $t=kT$ the coding is in a state $\Sigma_m$ of the N states, the arrival of the information bit $u_k$ of the sequence $\{u\}$ forces a transition to the state $\Sigma_q$ of the N states and the selection of the elementary signal $s_i(t)$ as x(t), where q and i are given by the following equations:

$$d_1 = m-1 \bmod 2$$

$$d_0 = d_1 + u_k \bmod 2$$

$$r = 2(m-1) + d_0$$

$$q = (r \bmod N) + 1$$

$$i = \begin{cases} r+1 & \text{if } r < N \\ r - 2N & \text{otherwise} \end{cases}$$

In accordance with an another aspect of the present invention, it was sought to provide the coding scheme in which the elementary signal $s_i(t)$, $i=\pm 1, \pm 2, \ldots, \pm N$, are such that $s_{-i}(t) = -s_i(t)$ and, for $i \geq 1$, in that:

$$s_i(t) = \begin{cases} \sum_{k=0}^{n} (b_k - 0.5) g\left(t + \left(k - \frac{n+1}{2}\right)T\right) & 0 \leq t \leq T \\ 0 & \text{otherwise} \end{cases}$$

where $$b_k = \left[\frac{i-1}{2^k}\right] \bmod 2 \quad k = 0, 1, \ldots, n$$

and g(t) is a pulse of time length $D=(n+1)T$ centered in the origin such that $g(t)=g(-t)$ and having constant values over time intervals of length T/2.

Also, in accordance with the present invention, it was sought to provide a transmission method for coded digital communications, characterized in that the digital date are coded by the above mentioned coding scheme, and the coded signal is transmitted in a transmission means.

In accordance with the present invention, also it was sought to provide an apparatus for coded digital communications, characterized in that it comprises a coder for coding the digital date according to the coding scheme claimed.

BRIEF DESCRIPTION OF THE DRAWINGS

To clarify the explanation of the innovative principles of the present invention and its advantages compared with the prior art there are described below with the aid of the annexed drawings possible embodiments thereof by way of non-limiting example applying said principles. In the drawing.

DETAILED DESCRIPTION OF THE PREFERRED EMBODIMENTS

Figure 1:
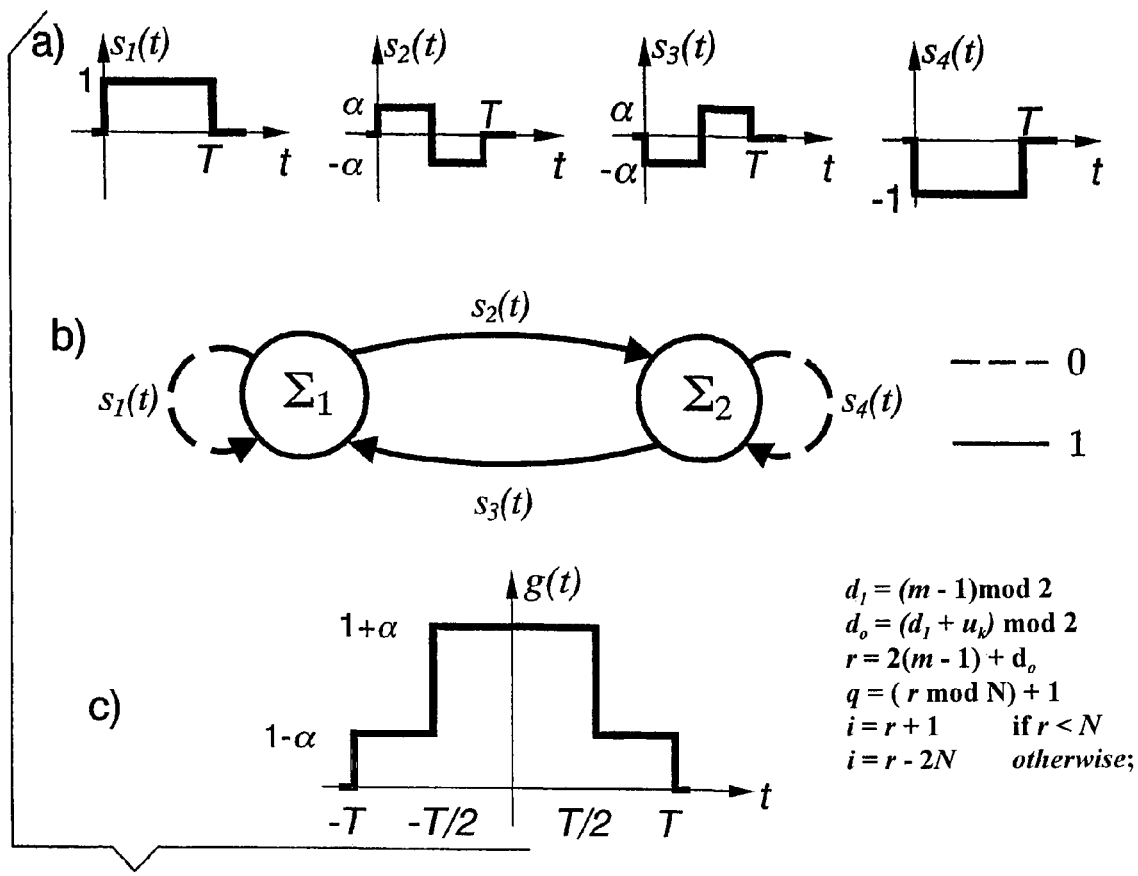
FIG. 1 shows a state diagram and elementary signals according to a first embodiment of the present invention (order-1 code)

With reference to the figures, FIG. 1 shows a state diagram and a set of elementary signals relating to a first embodiment of the invention in the case of order 1 code.

As illustrated, the new line code uses four waveforms or elementary signals $s_i(t)$, as shown in FIG. 1(a). It will be noted that the elementary signals form two pairs with one pair (e.g. $s_1(t)$ and $s_2(t)$) being the negative of the second pair (i.e. $s_4(t)$ and $s_3(t)$ respectively). In addition two of the elementary signals ($s_2(t)$ and $s_3(t)$), i.e. one form each pair are scaled by a factor α. The factor α will be chosen such as to produce the best spectral shape. The state diagram relating to this first line code according to the invention has two states, as shown in FIG. 1(b). The code states are denoted $\Sigma_1$, $\Sigma_2$ and the elementary signals are denoted $s_i(t)$, i=1, 2, 3, 4.

Figure 2:
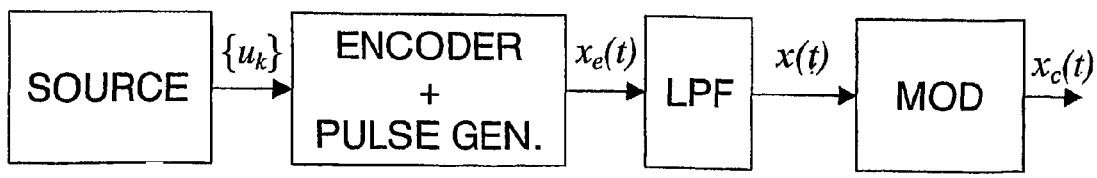
FIG. 2 shows a transmitter model configuration according to the present invention.

FIG. 2 shows a transmitter apparatus according to the invention in which a source of information SOURCE feeding an encoder according to the present invention. The output $x_e(t)$ of the encoder passes through low pass filter LPF to modulator MOD.

Figure 3:
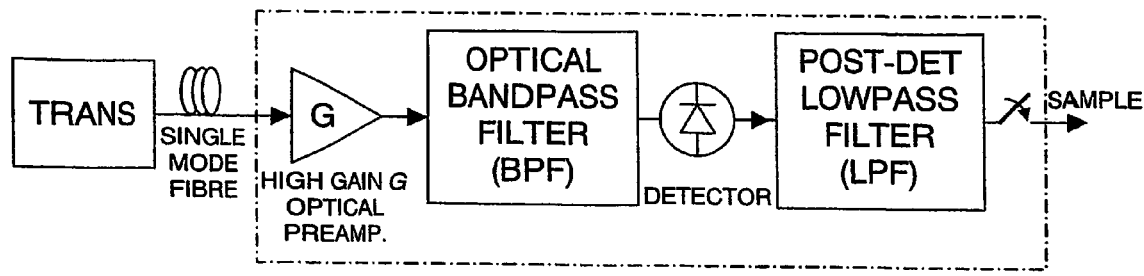
FIG. 3 shows a block diagram for a pre-amplified direct-detection optical system.

FIG. 3 shows the entire apparatus making use of the transmission method according to the invention to send the digital information in a transmission means, in particular a means formed by optical fibers. The system comprises the transmitter of FIG. 2 (block TRANS), the optical fibre (singlemode type fibre) and the receiver. The receiver comprises, in sequence, an optical preamplifier with power gain G, an optical bandpass filter BPF, a detector (DETECTOR), a lowpass filter LPF and the sampler. The decoded transmitted information sequence $\{u_k\}$ exits from the sampler output (SAMPLE). It will be noted that the code according to the invention don't need decoding because the elementary signals $s_i(t)$ (signals that represent "zero's" and "one's" of the transmitted sequence) have quite different power at the moment of the fotodetection. Since the DETECTOR detects the power of the input signal, a simple threshold circuit is sufficient for distinguishing "zero's" and "one's".

The information sequence $\{u_k\}$ with rate T is encoded as shown in FIG. 3 to form the signal:

$$x_e(t) = \sum_{k=-\infty}^{\infty} g_1(\sigma_k) s_e(t - kT; u_k) \quad (1)$$

where $\sigma_k$ denotes the generic encoder state and $g_1(\sigma_k)$ is a coefficient which is defined by the following rule:

$$g_1(\sigma_k) = \begin{cases} 1 & \text{if } \sigma_k = \Sigma_1 \\ -1 & \text{if } \sigma_k = \Sigma_2 \end{cases} \quad (2)$$

where $\Sigma_1$ and $\Sigma_2$ indicate the states allowed to the encoder, and $s_e(t;u_k)$ is one of the two elementary signals $s_1(t)$ or $s_2(t)$ selected in accordance with the following rule:

$$s_e(t; u_k) = \begin{cases} s_1(t) & \text{if } u_k = 0 \\ s_2(t) & \text{if } u_k = 1 \end{cases} \quad (3)$$

Hence the elementary signal output from the encoder will be one of $s_1(t)$ or $s_2(t)$ or their negative (i.e. $s_4(t)$ or $s_3(t)$ respectively) depending on the value of $g_1(\sigma_k)$, as shown in FIG. 1.

The sequence of states of the encoder is defined in the invention by the following rule:

$$\sigma_{k+1} = g_2(u_k, \sigma_k) \quad (4)$$

where the value of the function $g_2$ to be used in the embodiment is described by the following map:

| $u_k \backslash \sigma_k$ | $\Sigma_1$ | $\Sigma_2$ |
|---|---|---|
| 0 | $\Sigma_1$ | $\Sigma_2$ |
| 1 | $\Sigma_2$ | $\Sigma_1$ |

Figure 4:
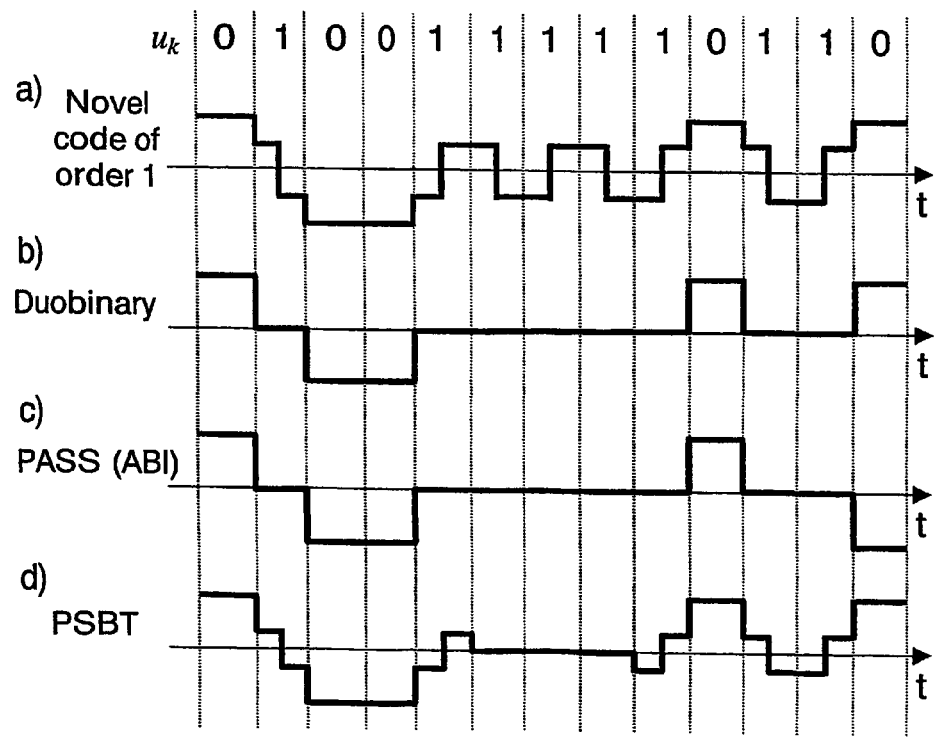
FIG. 4 shows example waveforms of prior art and novel line codes.

An example of a waveform $x_e(t)$ generated by the novel line code (with α=0.5) is shown in FIG. 4a together with, for comparison, signals generated with duobinary (FIG. 4b), PASS (FIG. 4c) and PSBT (FIG. 4d) codes of the prior art.

The power spectral density of the signal $x_e(t)$ in (1) coded according to the state diagram of FIG. 1 turns out to be:

$$G_e(f) = \quad (5)$$
$$\frac{1}{T}|S_1(f)|^2 \cos^2 \pi f T + \frac{1}{T}|S_2(f)|^2 \sin^2 \pi f T + j\frac{1}{T}S_1(f)S_2^*(f)\sin^2 \pi f T$$

where $S_1(f)$ and $S_2(f)$ are the Fourier transforms of the elementary signals $s_1(t)$ and $s_2(t)$, respectively.

The state diagram in FIG. 1(b) may be used in combination with any selection of elementary signals $$\{S_i(t)\}_{i=1}^{4},$$

and the power spectral density in (5) holds as long as $S_3(t)=-S_2(t)$ and $S_4(t)=-S_1(t)$.

The choice of different elementary signal sets for $s_i(t)$, i=1, 2, 3, 4 does not significantly affect the performance as long as a post-coder filter is adopted. For this reason we limit ourselves here to the set of elementary signals shown in FIG. 1(a).

A better understanding of the structure and characteristics of the order-1 code can be gained by expressing the form of the four elementary signals in FIG. 1 mathematically as linear combinations of rectangular pulses of duration T/2:

$$p(t) = \begin{cases} 1 & 0 \le t \le T/2 \\ 0 & \text{elsewhere} \end{cases} \quad (6a)$$

In this case we get for the elementary signals $s_i(t)$, i=1, 2, 3, 4 the following expressions:

$$s_1(t)=p(t)+p(t-T/2)$$

$$s_2(t)=\alpha[p(t)-p(t-T/2)]$$

$$s_3(t)=-s_2(t)$$

$$s_4(t)=-s_1(t) \quad (6b)$$

which will lead to an useful generalization in the case of the order-n code, as described below. When using (6a) we may also write $G_e(f)$ in terms of $P(f)$, the Fourier transform of p(t), as follows $$G_e(f) = \frac{1}{T}[(1+\alpha)\cos\pi fT/2 + (1-\alpha)\cos3\pi fT/2]^2 |P(f)|^2 \quad (7a)$$

$$P(f) = \frac{T}{2}\text{sinc}(fT/2)e^{-j\pi fT/2} \quad (7b)$$

Figure 5:
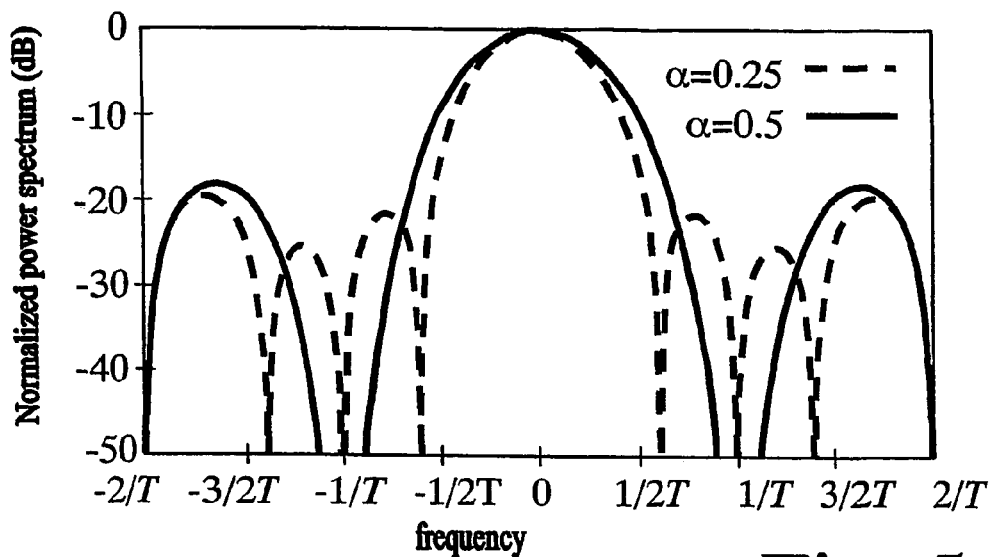
FIG. 5 shows the novel order-1 line code power spectrum at the encoder output for two values of the parameter α.

The power spectrum is shown in FIG. 5 for two values of the parameter $\alpha$. As can be seen, when increasing $\alpha$ the main lobe gets broader, but there is a stronger attenuation at the frequencies around 1/T and more energy is pushed in the Nyquist bandwidth. This behaviour has important consequence in selecting the best value of $\alpha$. Notice that expression (7a) per $G_e(f)$ holds as long as $s_i(t)$ are given by (6b) irrespectively of the actual shape of p(t), which may also be different from (6a), as already stated.

As described above with reference to FIG. 2, the signal $x_e(t)$ in (1) is then lowpass filtered prior to driving the modulator. It will be seen later on that this low-pass filter has important effects on the overall performance.

In order to introduce the new order-n codes, we notice that, although the order-1 code is fully described by its diagram in FIG. 1, we may also envision its output signal $x_e(t)$ in (1) as an equivalent PAM (Pulse Amplitude Modulated) signal, as follows $$x_e(t) = \sum_{k=-\infty}^{\infty} w_k g(t - T - kT) \quad (8)$$

where (see FIG. 1c for a graph of g(t))

$$g(t) = (1-\alpha)\text{rect}\left(\frac{t}{2T}\right) + 2\alpha\text{rect}\left(\frac{t}{T}\right) \quad (9a)$$

$$\text{rect}\left(\frac{t}{T}\right) \triangleq \begin{cases} 1 & |t| \leq \tau/2 \\ 0 & \text{otherwise} \end{cases} \quad (9b)$$

and $$w_k = b_k - 0.5 \quad (10)$$

where the precoded symbols $b_k$ are obtained from the information symbols $u_k$ by $$b_k = u_k + b_{k-1} \bmod 2 \quad (11)$$

The encoder acts as if "large" output signals g(t) weighted by the coefficients $w_k$ were generated every T seconds, therefore overlapping each other to introduce a controlled amount of intersymbol interference. This interpretation is very useful because it allows to recognize that when the PAM pulse g(t) in (9a) is filtered by a Gaussian filter of bandwidth equal to ½T, the filter output fits very well a "prolate spheroidal wave function", which, for a given time spread, has the most concentrated spectrum in frequency. This means that the filtered $x_e(t)$ has a power spectral density the most concentrated in frequency and therefore is more robust to the chromatic dispersion. Indeed, it can be shown that a sufficiently dispersive fiber turns an input pulse $s_{in}(t)$ with Fourier transform $S_{in}(f)$ and bandwidth $B_{in}$, into the output pulse envelope approximately given by $$|s_{out}(t)| \approx \frac{1}{T\sqrt{\pi\gamma}}\left|S_{in}\left(-\frac{t}{\pi\gamma T^2}\right)\right| \text{ for } \gamma(\pi B_{in}T)^2 \gg 1 \quad (12)$$

where $\gamma$ is the chromatic dispersion index of the fibre, defined as $$\gamma = \frac{D\lambda^2}{\pi c}R_b^2 L$$

where c is the light speed, $\lambda$ is the optical wavelength corresponding to the optical carrier frequency, D is the fibre chromatic dispersion parameter at $\lambda$ (usually provided in ps/nm/km), $R_b$ is the bit rate and L is the fibre length. The above formula (12) turns out to be an exact relation instead that an approximation when the input pulse is properly chirped. So, the most concentrated in frequency the pulse, the less the effect of the intersymbol interference due to the chromatic dispersion in the output signal.

The signal y(t), corresponding to (1) or (8), at the output of the post-detection lowpass filter is of binary type and an example eye diagram corresponding to a 32-bit pattern with $R_b$=10 Gb/s, dispersive fibre of length L≈10 km and chromatic dispersion D=17 ps/nm/km at $\lambda$=1550 nm.

Figure 7:
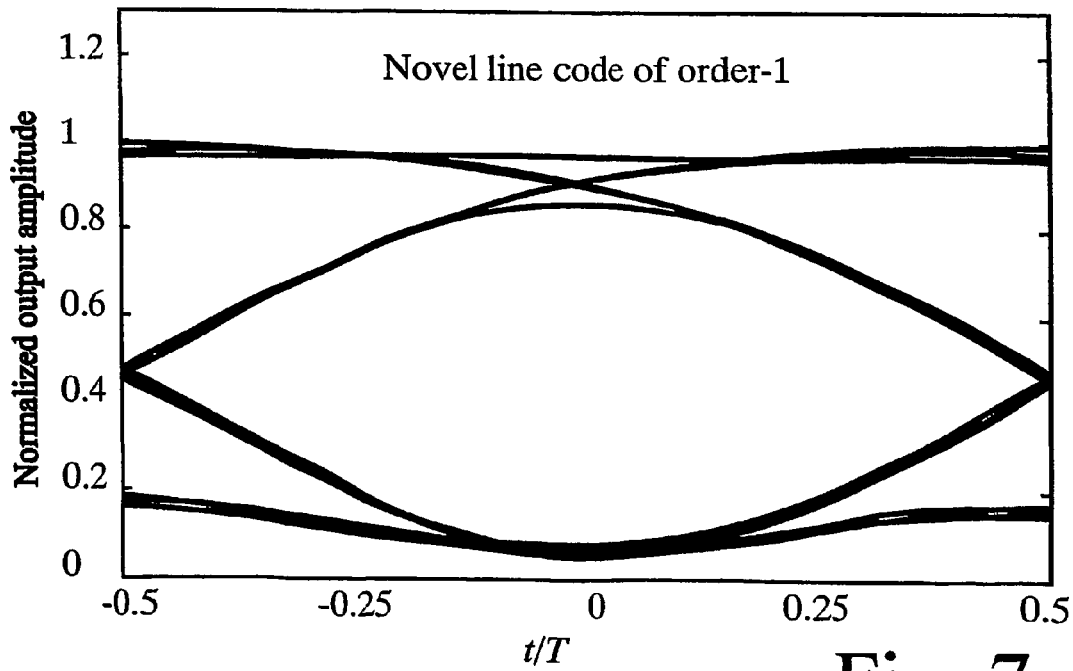
FIG. 7 shows an eye diagram for the novel line code according to the invention in the case of order 1.

A corresponding eye diagram for duobinary/PSBT is shown in FIG. 7. Comparing the figures, it is evident the effectiveness of the novel line code according to the invention. It is evident that when $\gamma$ increases, so does the time spread of $s_{out}(t)$ in (12) and we reach a point where the intersymbol interference cannot be avoided any longer by the code of order 1. But observing that for $\gamma'=2\gamma$ to the input pulse $$s'_{in}(t) = \frac{1}{\sqrt{2}}s_{in}(t/2),$$

having the same energy of $s_{in}(t)$, would correspond the same output pulse corresponding to $s_{in}(t)$ at $\gamma$, we conclude that when the dispersion doubles we can still avoid intersymbol interference by using an equivalent PAM pulse of double duration (in this case, however, chirping may be required). The signal $x_e(t)$ corresponding to an equivalent PAM pulse of length (n+1)T may be obtained by a coder of order n, as described below.

We now describe the general rule, embodiment of the coder of order n according to the present invention. As above disclose, a coder is described by its states, the transitions between states and the elementary signals correspondingly generated.

The order-n coder has $N=2^n$ states, denoted by $\Sigma_i$, $i=1, 2, \ldots, N$, and the transitions and signal generations are specified by the following rule. If at the time $t=kT$ the coder is in the state $\Sigma_m$, the arrival of the information bit $u_k$ forces a transition to the state $\Sigma_q$ and the transmission of the elementary signal $s_i(t)$, where q and i are given by the following equations:

$$d_1 = m - 1 \bmod 2 \quad (13a)$$
$$d_0 = d_1 + u_k \bmod 2$$
$$r = 2(m-1) + d_0$$
$$q = (r \bmod N) + 1$$
$$i = \begin{cases} r+1 & \text{if } r < N \\ r - 2N & \text{otherwise} \end{cases}$$

The elementary signals $s_i(t)$, $i=\pm 1, \pm 2, \ldots, \pm N$ are such to form couples in which $s_{-i}(t) = -s_i(t)$ and for $i \geq 1$ $$s_i(t) = \begin{cases} \sum_{k=0}^{n} (b_k - 0.5) g\left(t + \left(k - \frac{n+1}{2}\right)T\right) & 0 \leq t \leq T \\ 0 & \text{otherwise} \end{cases} \quad (13b)$$

where $$b_k = \left[\frac{i-1}{2^k}\right] \bmod 2 \quad k = 0, 1, \ldots, n \quad (13c)$$

and now $g(t)$ is a pulse of time length $D=(n+1)T$ centered in the origin such that $g(t)=g(-t)$ and assuming piecewise constant values (chosen to produce the best spectral configuration) over time intervals of length $T/2$. To obtain the k-th information symbol the post-detection lowpass filter output signal $y(t)$ is to be sampled at the time $$t_k = \left(k + \frac{n}{2}\right)T.$$

It is obvious that the division in (13c) is a integer division.

Depending on the n-order used, the elementary signals $s_i(t)$ obtained by the (13b) have characteristic independent from their particular shape. For example, in the above mentioned case of order-1, the signals named $s_2(t)$ and $s_3(t)$ in FIG. 1a (which form the couple $s_{-i}(t)=-s_i(t)$ in the general notation) must be shaped for having at least a change of sign in the middle point of the bit interval. Therefore, more different shapes of the elementary signals $s_i(t)$ can be used in accordance with the principles of the present invention, that is following the coding scheme given by (13a), or any shape that can be obtaining with any type of filtering of the elementary signals $s_i(t)$ obtained by (13b). In other words, $s_i(t)$ obtained by (13b) can be filtered before coding.

Any couple of the elementary signals $s_i(t)$ has level different than level of the other couples of the elementary signals $s_i(t)$.

Figure 8:
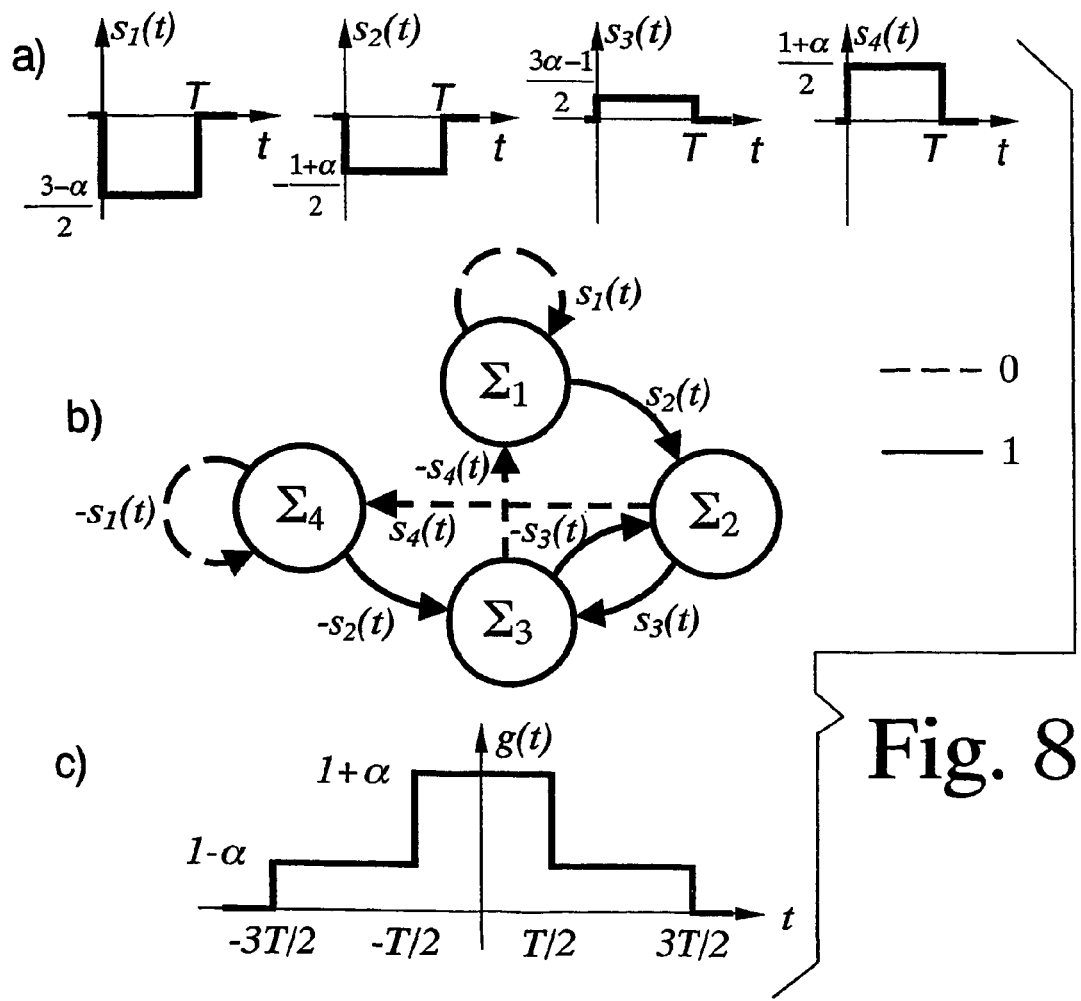
FIG. 8 shows a state diagram and elementary signals according to a second embodiment of the present invention (order-2 code)
Figure 6:
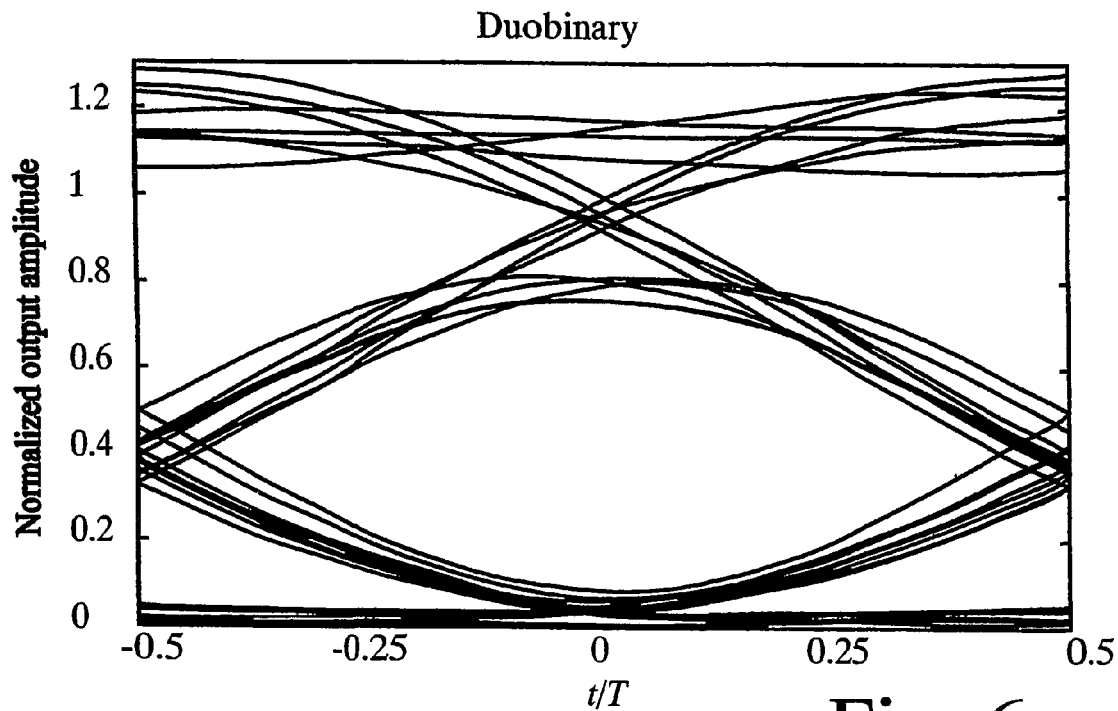
FIG. 6 shows an eye diagram for the known duobinary code.

As another example of embodiment, a state diagram (FIG. 8b) and elementary signals (FIG. 8a: for simplicity, the four signals $-s_i(t)$ are not shown) for a 4-state coder (order n=2) are shown in FIG. 8. Equivalent PAM pulse $g(t)$ is shown in FIG. 8c.

Figure 9:
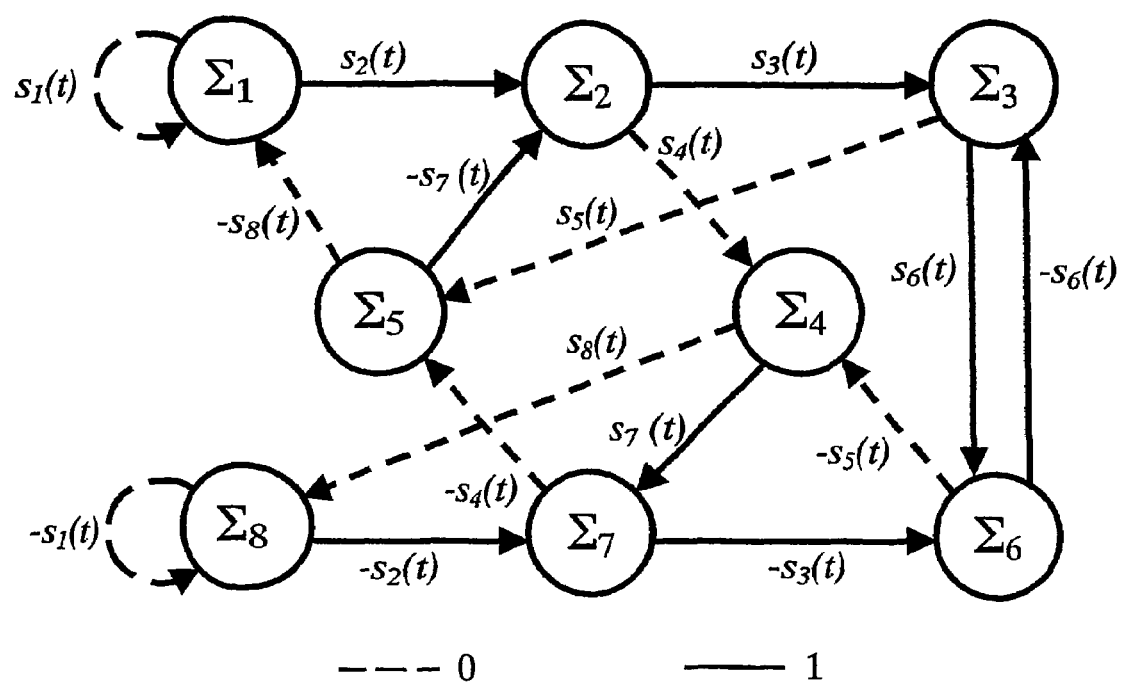
FIG. 9 shows a state diagram according to a third embodiment (order-3 code).

Another example state diagram for a 8-state coder (order n=3) is shown in FIG. 9 (for simplicity, elementary signals and equivalent PAM pulse are not shown).

In order to evaluate the performance of the line-coded pre-amplified direct-detection system shown in FIG. 2 and FIG. 3, we apply here the analysis presented in the paper by E. Forestieri referred to above as it poses no restrictions on the signal types and on the kind of the pre- and post-detection filters. In this manner, we have found that the best choice for the parameter $\alpha$ in (6b), according to invention, is $\alpha=0.5$.

For highly dispersive fibres ($\gamma > 0.35$), the most effective transmitter lowpass filter LPF in FIG. 2, is ideal of bandwidth equal to half the bit rate in the uncoded, duobinary and PASS case, while for the novel optical line code according to the invention the best filter turns out to be a Gaussian one with the same bandwidth. In this case, numerical results show that the novel line code performs better than all other coding schemes (among which the best are the narrow filtered duobinary and PSBT, whose performances are the same) as, given the same transmitted power (e.g. about 4 dBs more than that necessary for an uncoded transmission over a non-dispersive fibre), it allows to span a distance 1.5 times greater than that allowed by duobinary before the probability of bit error exceeds $P_b = 10^{-12}$.

At this point, it is clear that the objectives of the present invention have been achieved by making a coding scheme having better performance than prior art schemes by means of a innovative state diagram and a particular selection of elementary signals.

Naturally the above description of embodiments applying the innovative principles of the present invention is given by way of non-limiting example of said principles within the scope of the exclusive right claimed here. For example it is clear for an expert in the art that the "bit 0" and "bit 1" indications used here can be exchanged to each other and the indexes used in the elementary waveform notation can be changed (for example, in FIG. 1a the indexes 1, 2, 3, 4 can be 1, 2, −1, −2, as obvious by the general case of order n).

What is claimed is:

1. A method of transmitting data, comprising the steps of: encoding said data to obtain a code of order n for transmission from a transmitter to a receiver in a communications system; operating an encoder to obtain a coded signal x(t) which represents binary data which are constituted by sequences of information bits $\{u_k\}$ with rate T, the code having $N=2^n$ states named $\Sigma_i$, for $i =1, 2, \ldots, N$ for the encoder, and predetermined elementary signals $s_i(t)$ which are combined in the coded signal x(t): if, at the time $t =kT$, the code is in a state $\Sigma_m$ of the N states for the encoder, forcing a transition to the state $\Sigma_q$ of the N states upon arrival of information bit $u_k$ of the sequence of information bits $\{u_k\}$; selecting the elementary signals $s_i(t)$ as x(t), where q and i are given by the following equations:

$$d_1 = (m-1) \bmod 2$$
$$d_0 = (d_1 + u_k) \bmod 2$$
$$r = 2(m-1) + d_0$$
$$q = (r \bmod N) + 1$$
$$i = r + 1 \quad \text{if } r < N$$
$$i = r - 2N \quad \text{otherwise};$$

wherein the elementary signals $s_i(t)$, for $i = \pm 1, \pm 2, \ldots, \pm N$, are such that $s_{-i}(t) = -s_i(t)$ and, for $i \geq 1$, in which:

$$s_i(t) = \begin{cases} \sum_{k=0}^{n} (b_k - 0.5) g\left(t + \left(k - \frac{n+1}{2}\right)T\right) & 0 \leq t \leq T \\ 0 & \text{otherwise} \end{cases}$$

where $$b_k = \left[\frac{i-1}{2^k}\right] \mod 2 \quad k = 0, 1, \ldots, n$$

and $g(t)$ is a pulse of time length $D = (n+1)T$ centered in the origin such that $g(t) = g(-t)$ and having constant values over time intervals of length $T/2$;

wherein the elementary signals $s_i(t)$, for $i = \pm 1, \pm 2, \ldots, \pm N$, constitute couples of signals $s_{-i}(t) = -s_i(t)$, have levels not zero in a time interval of length $T$, and have levels zero elsewhere, and wherein each couple of the signals has a level different for the level of other couples of the signals.

2. The method as claimed in claim 1, in which the level differences are chosen for improving the spectral configuration.

3. The method as claimed in claim 1, in which the signals of one of the couples of the signals have a sign inversion in $T/2$.

4. The method as claimed in claim 3, in which the signals of said one of the couples of the signals have constant level over time intervals of length $T/2$.

5. The method as claimed in claim 3, in which, when the order is $n=1$, another of said couples of signals is constituted of a constant level pulse of length $T$.

6. The method as claimed in claim 5, in which the constant level of said one of the couples of the signals is less than the constant level of the other of said couples of the signals.

7. The method as claimed in claim 6, in which the constant level of said one of the couples of the signals is equal to half of the constant level of the other of said couples of the signals.

8. The method as claimed in claim 1, in which the elementary signals $s_i(t)$ are filtered for resulting in the elementary signals $s_i(t)$ forming the coded signal $x(t)$.

9. A method of transmitting data from a transmitter to a receiver in a communications system, comprising: operating an encoder to encode a code of order $n$ to obtain a coded signal $x(t)$ which represents binary data which are constituted by sequences of information bits $\{u_k\}$ with rate $T$, the code having $N = 2^n$ states named $\Sigma_i$, for $i = 1, 2, \ldots, N$ for the encoder, and predetermined elementary signals $s_i(t)$ which are combined in the coded signal $x(t)$; if, at the time $t = kT$, the code is in a state $\Sigma_m$ of the $N$ states for the encoder, forcing a transition to the state $\Sigma_q$ of the $N$ states upon arrival of information bit $u_k$ of the sequence of information bits $\{u_k\}$; selecting the elementary signals $s_i(t)$ as $x(t)$, where $q$ and $i$ are given by the following equations:

$d_1 = (m-1) \mod 2$ $d_0 = (d_1 + u_k) \mod 2$ $r = 2(m-1) + d_0$ $q = (r \mod N) + 1$ $i = r + 1$ if $r < N$ $i = r - 2N$ otherwise; and transmitting the coded signal from the encoder over the communications system to the receiver;

wherein the elementary signals $s_i(t)$, for $i = \pm 1, \pm 2, \ldots, \pm N$, are such that $s_{-i}(t) = -s_i(t)$ and, for $i \geq 1$, in which:

$$s_i(t) = \begin{cases} \sum_{k=0}^{n} (b_k - 0.5) g\left(t + \left(k - \frac{n+1}{2}\right)T\right) & 0 \leq t \leq T \\ 0 & \text{otherwise} \end{cases}$$

where $$b_k = \left[\frac{i-1}{2^k}\right] \mod 2 \quad k = 0, 1, \ldots, n$$

and $g(t)$ is a pulse of time length $D = (n+1)T$ centered in the origin such that $g(t) = g(-t)$ and having constant values over time intervals of length $T/2$;

wherein the elementary signals $s_i(t)$, for $i = \pm 1, \pm 2, \ldots, \pm N$, constitute couples of signals $s_{-i}(t) = -s_i(t)$, have levels not zero in a time interval of length $T$, and have levels zero elsewhere, and wherein each couple of the signals has a level different for the level of other couples of the signals.

10. The method as claimed in claim 9, in which the system includes dispersive optical fibers.

11. An apparatus for transmitting data between a transmitter and a receiver, comprising: an encoder for coding the data for a code of order $n$ to obtain a coded signal $x(t)$ which represents binary data which are constituted by sequences of information bits $\{u_k\}$ with rate $T$, the code having $N = 2^n$ states named $\Sigma_i$, for $i = 1, 2, \ldots, N$ for the encoder, and predetermined elementary signals $s_i(t)$ which are combined in the coded signal $x(t)$; if, at the time $t = kT$, the code is in a state $\Sigma_m$ of the $N$ states, forcing a transition to the state $\Sigma_q$ of the $N$ states upon arrival of information bit $u_k$ of the sequence of information bits $\{u_k\}$; selecting the elementary signals $s_i(t)$ as $x(t)$, where $q$ and $i$ are given by the following equations:

$d_1 = (m-1) \mod 2$ $d_0 = (d_1 + u_k) \mod 2$ $r = 2(m-1) + d_0$ $q = (r \mod N) + 1$ $i = r + 1$ if $r < N$ $i = r - 2N$ otherwise; and wherein the elementary signals $s_i(t)$, for $i = \pm 1, \pm 2, \ldots, \pm N$, are such that $s_{-i}(t) = -s_i(t)$ and, for $i \geq 1$, in which:

$$s_i(t) = \begin{cases} \sum_{k=0}^{n} (b_k - 0.5) g\left(t + \left(k - \frac{n+1}{2}\right)T\right) & 0 \leq t \leq T \\ 0 & \text{otherwise} \end{cases}$$

where $$b_k = \left[\frac{i-1}{2^k}\right] \mod 2 \quad k = 0, 1, \ldots, n$$

and $g(t)$ is a pulse of time length $D = (n+1)T$ centered in the origin such that $g(t) = g(-t)$ and having constant values over time intervals of length $T/2$;

wherein the elementary signals $s_i(t)$, for $i = \pm 1, \pm 2, \ldots, \pm N$, constitute couples of signals $s_{-i}(t) = -s_i(t)$, have levels not zero in a time interval of length T, and have levels zero elsewhere, and wherein each couple of the signals has a level different for the level of other couples of the signals.

12. The apparatus as claimed in claim 11, in which the coded signal is transmitted in a transmission means between the transmitter and the receiver.

13. The apparatus as claimed in claim 12, in which the transmission means are dispersive optical fibers.

14. The apparatus as claimed in claim 12, in which a lowpass filter is provided between the encoder and the transmission means.

* * * * *

UNITED STATES PATENT AND TRADEMARK OFFICE
CERTIFICATE OF CORRECTION

PATENT NO. : 7,333,734 B2
APPLICATION NO. : 10/450326
DATED : February 19, 2008
INVENTOR(S) : Forestieri et al.

It is certified that error appears in the above-identified patent and that said Letters Patent is hereby corrected as shown below:

On the Title Page, item (57), under "ABSTRACT", in Column 2, Line 12, delete "$u_k$mod 2;" and insert -- $u_k$ mod 2; --, therefor.

In Column 1, Line 4, insert -- <u>CROSS REFERENCE TO RELATED APPLICATION</u> This application is a continuation of U.S. Patent Application Serial No. 10/450,326, filed November 7, 2003, now pending --.

In Column 1, Line 38, delete "Phrased" and insert -- Phased --, therefor.

In Column 1, Line 38, delete "Siginalling" and insert -- Signalling --, therefor.

In Column 2, Line 3, delete "N=2'" and insert -- $N=2^n$ --, therefor.

In Column 5, Line 67, in Equation (11), delete "$b_k=u_k+b_{k-1}$mod2" and insert -- $b_{kz}=u_k+b_{k-1}$ mod2 --, therefor.

In Column 10, Line 67, in Claim 11, delete "$s_i(t)=-s_i(t)$," and insert -- $s_{-i}(t)=-s_i(t)$, --, therefor.

Signed and Sealed this

Twenty-third Day of December, 2008

JON W. DUDAS
*Director of the United States Patent and Trademark Office*